United States Patent [19]

Kawasaki

[11] Patent Number: 4,468,165

[45] Date of Patent: Aug. 28, 1984

[54] APPARATUS FOR TRANSPORTING SORTED STACKED MATTER

[75] Inventor: Kazumi Kawasaki, Yokohama, Japan

[73] Assignee: Tokyo Shibaura Denki Kabushiki Kaisha, Kawasaki, Japan

[21] Appl. No.: 411,365

[22] Filed: Aug. 25, 1982

[30] Foreign Application Priority Data

Aug. 28, 1981 [JP] Japan ............................... 56-135133

[51] Int. Cl.[3] ............................................ B65G 37/00

[52] U.S. Cl. .................................... 414/417; 198/472; 209/900; 414/102

[58] Field of Search ................. 414/46, 102, 134, 285, 414/417; 198/472; 209/900

[56] References Cited

U.S. PATENT DOCUMENTS

| | | | |
|---|---|---|---|
| 3,184,061 | 5/1965 | Levy | 209/900 X |
| 3,370,549 | 2/1968 | Livingston | 198/472 X |
| 3,583,580 | 6/1971 | Dean | 414/102 X |
| 3,757,939 | 9/1973 | Henig | 209/900 X |
| 3,776,395 | 12/1973 | Lingg et al. | 198/472 X |
| 3,782,541 | 1/1974 | Wood | 209/900 X |

FOREIGN PATENT DOCUMENTS

| | | |
|---|---|---|
| 484102 | 10/1929 | Fed. Rep. of Germany . |
| 925879 | 3/1955 | Fed. Rep. of Germany . |

*Primary Examiner*—Leslie J. Paperner

*Attorney, Agent, or Firm*—Cushman, Darby and Cushman

[57] ABSTRACT

Sorted stacked matter in a plurality of stacking boxes arranged in an array in a vertical plane is transferred to a plurality of trays supported on a plurality of horizontal endless conveyor belts arranged one above another. These trays are transferred to a tray lowering unit including a plurality of elevators and are lowered by the unit to a position at the same level as the lowermost first horizontal endless conveyor belt. These trays are then transferred to a second horizontal endless conveyor belt. At the forward end of the second horizontal endless conveyor belt, the transported matter is transferred from each tray to a next process section. The empty tray that results is transported on a third horizontal endless conveyor belt to an empty tray raising unit which is disposed adjacent to the starting end of the first horizontal endless conveyor belts to be re-distributed thereto.

7 Claims, 8 Drawing Figures

APPARATUS FOR TRANSPORTING SORTED STACKED MATTER

BACKGROUND OF THE INVENTION

This invention relates to a transporting apparatus which takes out postal matter or like sheets or sheet-like parts sorted and stacked in a plurality of stacking boxes in a plurality of vertically arranged rows and transports the taken-out matter to a next process station.

Postal matter such as letters and postal cards which are collected in stacking boxes for different address areas, is a well-known example of matter that is sorted and stacked in stacking boxes. In the case of postal matter, stacks of sorted stacked matter in stacking boxes for different address areas are taken out and transported to a next common process section, in which an address card is put on each stack and the stack is then bundled together with the address card.

A prior art example of the transport apparatus, which handles postal matter, will now be described briefly with reference to FIGS. 1 and 2.

A sorting unit (a) comprises a number of stacking boxes. These stacking boxes are arranged in three horizontal rows, i.e., uppermost row (b), middle row (c) and lowermost row (d). Sorted postal matter (A) such as letters and postal cards is charged into corresponding stacking boxes in these rows from the front side of the boxes. The sorted postal matter (A) is periodically pushed out by a push-out mechanism (not shown) from the front side, as shown by an arrow, to be transferred onto trays, which are secured to endless conveyer belts (e, f, g) disposed in the vicinity of the back of the sorting unit (a) and corresponding to the respective rows of stacking boxes.

The conveyor belts (e, f, g) convey the trays containing the postal matter (A) transferred thereto to the end of the forward belt run. A common elevator (i) which consists of an endless transfer belt having trays secured thereto is disposed vertically behind the forward end of the conveyor belts (e, f, g). The postal matter (A) having been conveyed to the forward end is transferred to the common elevator (i), as shown by an arrow, by a pusher which is provided at the forward end of each conveyor belt. The elevator (i) brings down the postal matter (A) received from the individual conveyor belts (e, f, g) to a position at the same level as a horizontal transport line (k) which extends at a lower level than the level of the lowermost conveyor belt (g). When the postal matter (A) is brought to the lower set position, it is pushed out by a pusher (j) disposed behind the tray of the elevator (i), as shown by an arrow, to be transferred to one of trays secured to the transport line (k).

The transferred postal matter (A) is conveyed horizontally on the transport line (k), as shown by an arrow. When the postal matter (A), which is in the form of a stack, reaches an address card attaching station, (l), an address card (m) is placed on the stack. The postal matter stack is then further conveyed to reach a bundling station (n). In this station, the postal matter stack (A) is bundled together with the address card (m) attached thereto with a tape (p). The postal matter bundle (A) is then conveyed to a forward end of the line (k), where it is pushed out of the line (k) by a pusher (g), as shown by an arrow.

In the above transport system, the postal matter (A) is transferred three times from tray to tray by pushers in its course from each of the stacking boxes (b, c, d) in the sorting unit (a) to the following process stations of address card attachment and bundling. However, when the postal matter (A) stacked in a tray is transferred, it is likely to get out of the regularly stacked state. In such a case, a trouble in processing or defective processing will occur in the succeeding process stations.

For the above reason, it has desired to minimize the number of transfers of postal matter involved to thereby minimize the possibility of the postal matter getting out of the regularly stacked state.

In another aspect, on each of the conveyor belts (e, f, g) a plurality of trays are secured thereto at a fixed interval corresponding to the interval of the stacking boxes in the sorting unit (a). These trays have a considerable depth or height. After the postal matter (A) has been transferred from each tray on each of the conveyor belts (e, f, g) to the common elevator (i), the empty tray is conveyed by the lower return run of the belt back to its start position of transport as shown by dashed lines in FIG. 2. For this reason, the vertical interval of the conveyor belts (e, f, g) cannot be reduced beyond a certain limit, that is, the height dimension of each row of stacking boxes in the sorting unit (a) cannot be reduced beyond a certain limit. Therefore, if it is intended to provide a large number of vertically arranged rows of stacking boxes, the uppermost stacking box row is liable to be too high for operators to perform maintenance and inspections easily. Further, in the prior art transport apparatus as described above, the lower set position of the common elevator (i) has to be below the level of the lowermost conveyor belt (g), so that the height of the apparatus as a whole must be increased that much.

Accordingly, a construction of an apparatus, the height of which can be reduced, has been called for.

A further deficiency of the prior art transport apparatus is the fact that the conveyor belts (e, f, g) carry trays which are permanently secured to them. When the belt is elongated due to fatigue or the like in long use, an error is thus produced in the interval between the trays. As mentioned earlier, the interval of the trays must correspond to the interval of stacking boxes in the sorting unit. When an error is produced in the interval between the trays, therefore, the register between trays and stacking boxes is lost. If this results, stable operation can no longer be obtained. Moreover, when the belt is elongated, an error between the timing of feed of trays on the conveyor belts (e, f, g) and the timing of feed of trays in the elevator (i) is likely.

Accordingly, a transport apparatus which can ensure correct register between trays and stacking boxes and also correct coincidence of feeding of trays over a long period of time is desired.

SUMMARY OF THE INVENTION

An object of the invention is to provide an improved transport apparatus for transporting sorted and stacked matter, which involves a minimum number of times of transferring matter, can reduce the level of the uppermost row of stacking boxes, and can ensure correct register between trays and stacking boxes and correct coincidence of timings for the feeding of trays over a long period of time.

To attain this object, the transport apparatus basically has a construction in which trays are not secured to conveyor belts. The matter which is transported is transferred only twice, that is, once from each stacking box to a corresponding tray on a first horizontal conveyor unit, and then secondly, when it is fed out from the apparatus to a following process station. Otherwise, the postal matter is transferred together with a tray in the apparatus.

Thus, it is possible to minimize the possibility for the stack of matter to get out of the regularly stacked state at the time when the stack is transferred.

In addition, according to the invention, the height of the first conveyor unit can be reduced by virture of the construction in which the trays in the unit are not secured to the conveyor belts therein. More particularly, this is possible because, unlike the conventional apparatus, the empty trays can be returned on separate conveyors from the respective forward feed conveyors of the first horizontal conveyor unit, that is, a separate return conveyor unit is provided.

In the transport apparatus according to the invention, a vertical tray transport unit is provided adjacent to the end of the individual, vertically arranged conveyors of the first horizontal conveyor unit. A second horizontal conveyor unit is provided adjacent to a lower end of the tray transport unit. Trays containing matter stacked therein are transferred from the first horizontal conveyor unit to the second horizontal conveyor unit via the tray transport unit. At the end of the second horizontal conveyor unit, the transported matter is transferred from each tray to the following process. The second horizontal conveyor unit can be disposed to extend at the same level as the lowermost conveyor in the first horizontal conveyor unit, so that the height of the apparatus as a whole can be further reduced.

In the first horizontal conveyor unit, the trays are conveyed by the individual conveyors in frictional engagement therewith. Locking means which can lock each tray against the frictional engagement with the associated conveyor belt when the tray comes to a position in register with a corresponding stacking box, is provided. The locking means is constituted of a hook member formed on each tray and a magnetically operable stopper member capable of engagement in the hook member. With this arrangement, each tray can always be properly positioned to be in register with a corresponding stacking box irrespective of the elongation or deformation of the conveyor belt. Also, there is no possibility of an error in the timings of operation of the entire apparatus.

The apparatus, which transfers the trays, utilizing the frictional contact between the conveyor belt and the trays, is advantageous in another respect. If something intrudes into the transfer path while the trays are being transferred through the path, the trays are stopped. This is unfailingly achieved when a part of the transfer mechanism is deformed and then protrudes into the transfer path, a screw slipping out of the mechanism falls into the transfer path, or the article on any tray happens to hit something. Since the trays are stopped upon occurrence of such a mishap, neither the trays nor the articles on the trays will not be broken, and it can immediately be ascertained which part of the transfer mechanism is out of order and then to repair the part. If a similar mishap takes place in the conventional apparatus wherein trays are fixed to the conveyor belt, the trays or the parts of the transfer mechanism which are out of order may be damaged or broken in all probability.

BRIEF DESCRIPTION OF THE DRAWINGS

The above and further objects, features and advantages of the invention will become more apparent from the description of a preferred embodiment thereof when the same is read with reference to the accompanying drawings.

DETAILED DESCRIPTION OF THE PREFERRED EMBODIMENT

In this embodiment, postal matter (A) is handled as matter being transported. However, other matter than the postal matter, for instance various sheets and parts, can also be handled according to the present invention.

Figure 1:
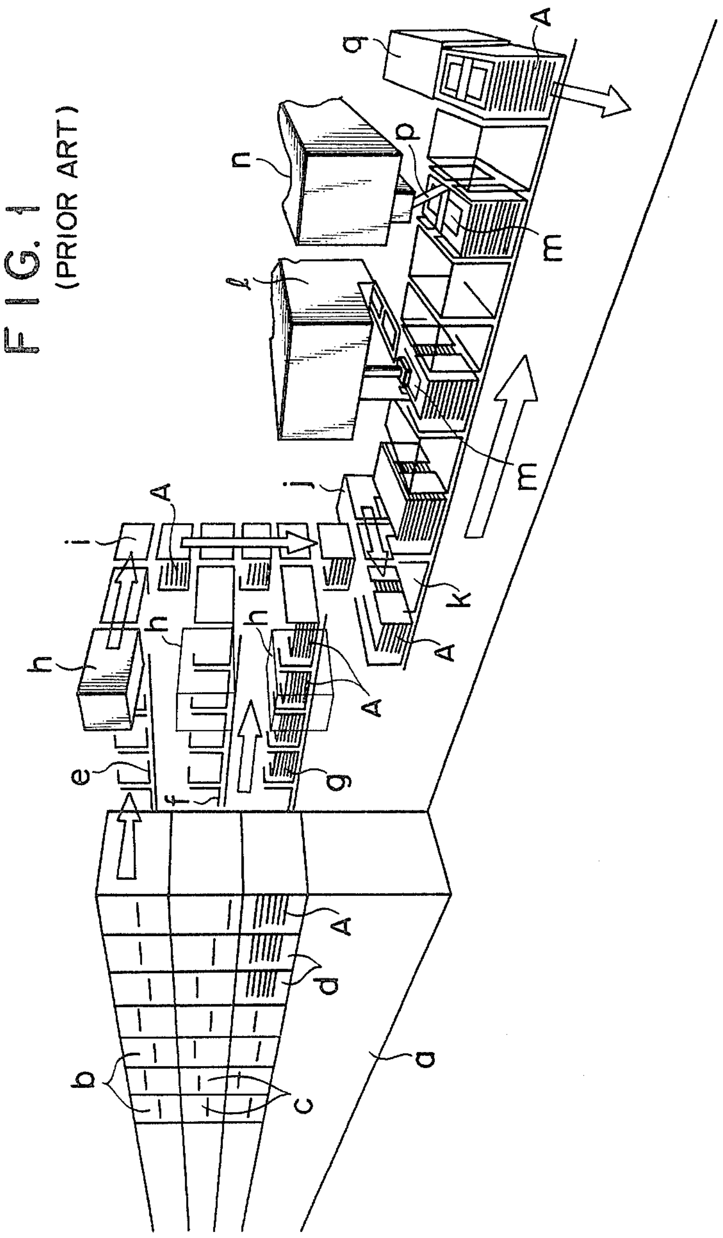
FIG. 1 (PRIOR ART)
FIG. 1 is a schematic perspective view showing a sorted and stacked postal matter transport system in the prior art.
Figure 2:
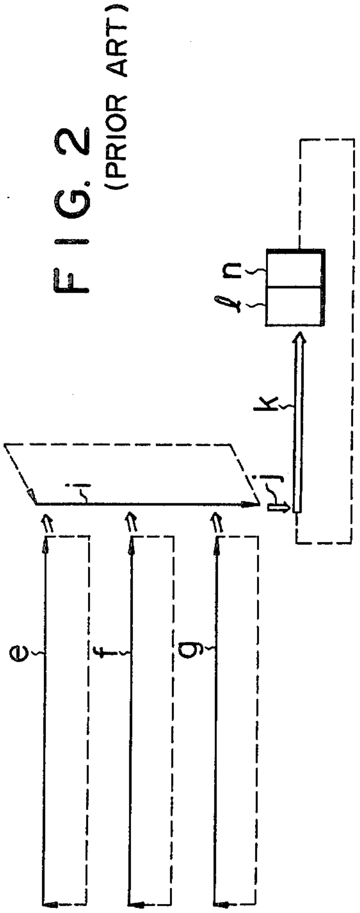
FIG. 2 (PRIOR ART)
FIG. 2 is a view showing the flow of transported matter and trays in the prior art transport system of FIG. 1.
Figure 3:
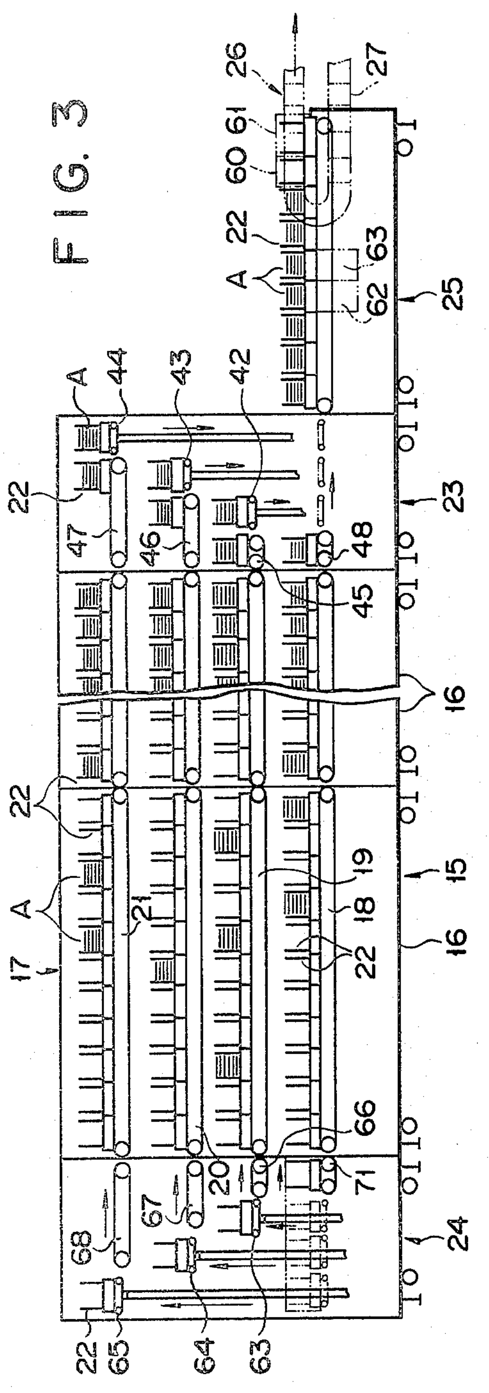
FIG. 3 is a schematic front view showing an embodiment of the transport apparatus according to the present invention.
Figure 4:
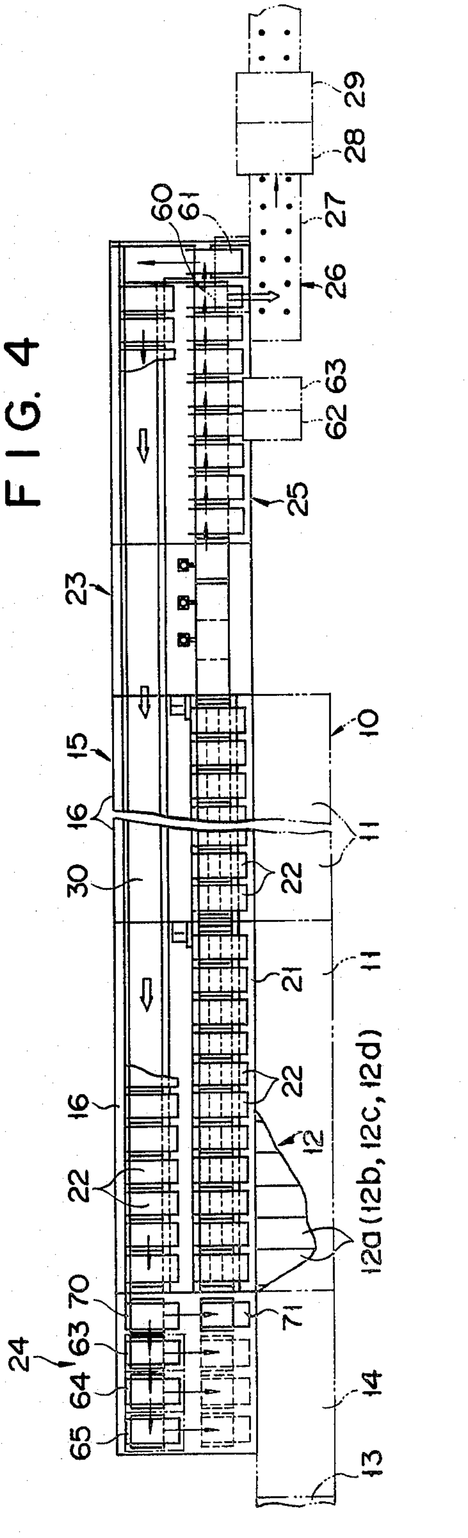
FIG. 4 is a top view of the same transport apparatus.

Referring to FIGS. 3 and 4, reference numeral 10 designates a sorting unit. The unit 10 includes a plurality of four horizontal sorting sub-units 11 arranged one above another. Each sorting sub-unit has a plurality of stacking boxes 12 arranged in a row. The appearance of the sorting unit 10 is substantially the same as that shown in FIG. 1. In FIG. 4, some of the stacking boxes 12*a* to 12*d* in the sorting unit are shown in a broken-apart state. The stacking boxes in the uppermost row are designated at 12*a*, those in the second row at 12*b*, those in the third row at 12*c*, and those in the lowermost row at 12*d*.

The sorting unit 13 includes a reading section 13 of a well-known construction. Postal matter (A) is sorted and distributed into the stacking boxes 12*a* to 12*d* in the individual rows according to sorting data read out from the postal matter by the reading section 13. Postal matter (A), the sorting data of which cannot be read out by the reading section 13, is not supplied to the sorting unit 10 but is collected in a well-known rejected-postal-matter collecting section 14.

When a suitable quantity of postal matter (A) is collected in each stacking box, it is pushed out by a well-known automatic pusher from the front side, i.e., from the lower side in FIG. 4, of the sorting unit 10 to the back side thereof.

A transport apparatus 15 according to the invention is disposed on the back side of the sorting unit 10 and parallel therewith. The transport apparatus 15 comprises a first horizontal conveyor unit 17, which includes a plurality (namely four in this embodiment) of first horizontal conveyor mechanisms 18 to 21, which consist of respective endless conveyor belts corresponding to and extending along the respective sorting sub-units 11 in the sorting unit 10. A plurality of trays 22 are supported at a predetermined interval on the upper conveyor belt run of each conveyor mechanism. Adjacent to the forward or feed-out end of the first horizontal conveyor unit 17, a tray transport unit 23 is disposed. Adjacent to the feed-in or starting end of the first horizontal conveyor unit 17, a second tray transport unit 24 is disposed. A second horizontal conveyor unit 25 which consists of a single endless conveyor belt is provided with its feed-in end disposed adjacent to the tray transport unit 23. The feed-out end of the second horizontal conveyor unit 25 is connected to a next process section 26 as shown by broken lines in FIGS. 3 and 4. The next process section 26 may be of a well-known construction, so that it is shown only briefly. The section includes a conveyor belt 27 with pins, an address card attaching station 28 and a bundling station 29.

Empty trays are returned from the end of the second horizontal conveyor unit 25 to the second tray transport unit 24 through an empty tray return route, which is constituted of a third horizontal conveyor unit 30. The third horizontal conveyor unit 30 consists of an endless conveyor belt, which is disposed on the side of the first horizontal conveyor unit 17 opposite the sorting unit 10, i.e., on the back side of the first horizontal conveyor unit 17 and extends parallel with the unit 17.

Figure 5:
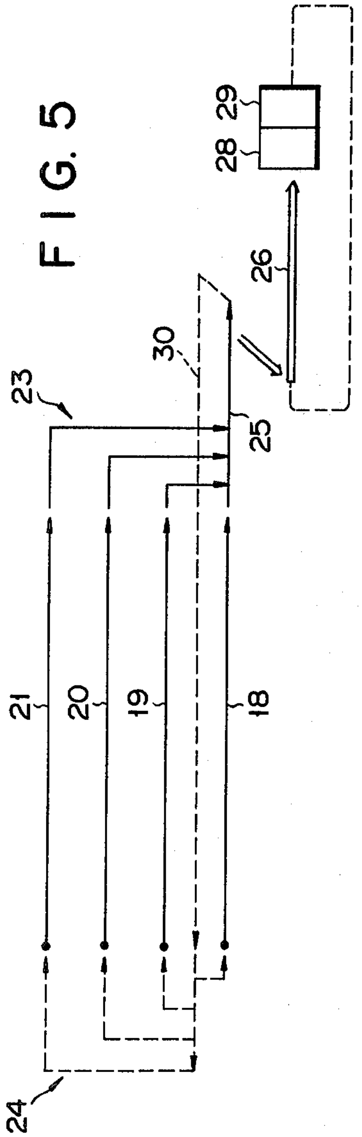
FIG. 5 is a view showing the flow of transported matter and trays in the transport apparatus of FIG. 3 according to the invention.

FIG. 5 shows the flow of transported postal matter and trays in the apparatus, which will be described hereinafter in detail.

Figure 6:
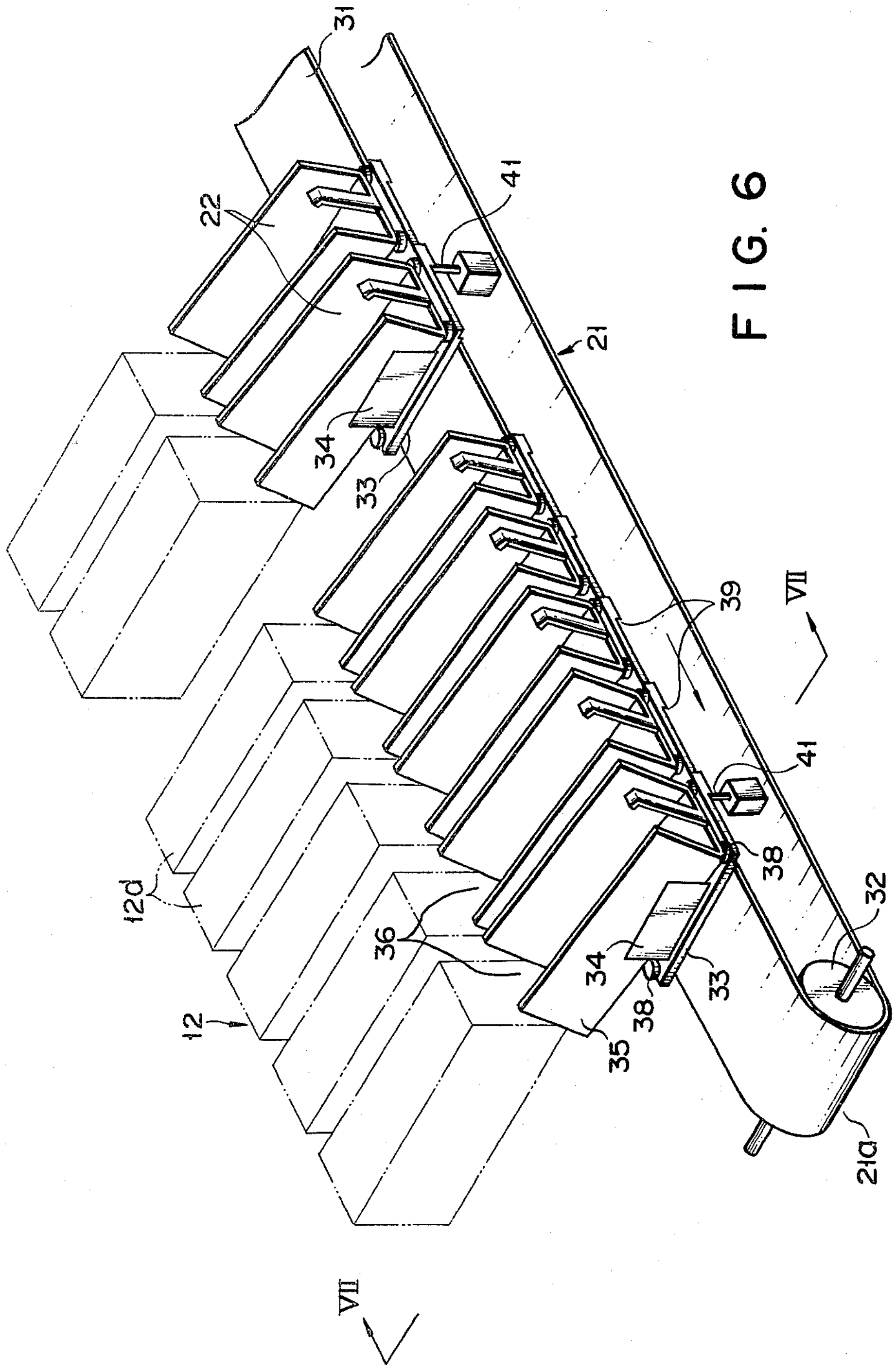
FIG. 6 is a detailed fragmentary perspective view showing a first horizontal conveyor unit in the transport apparatus of FIG. 3 according to the invention.

The trays 22 supported on the individual first horizontal conveyor mechanisms 18 to 21 are spaced apart at the same pitch as the pitch of spacing of the stacking boxes 12 in the sorting unit 10. FIG. 6 shows the detailed construction of the uppermost conveyor mechanism 21. The other conveyor mechanisms 18 to 20 also have the same construction as the mechanism 21.

Figure 7:
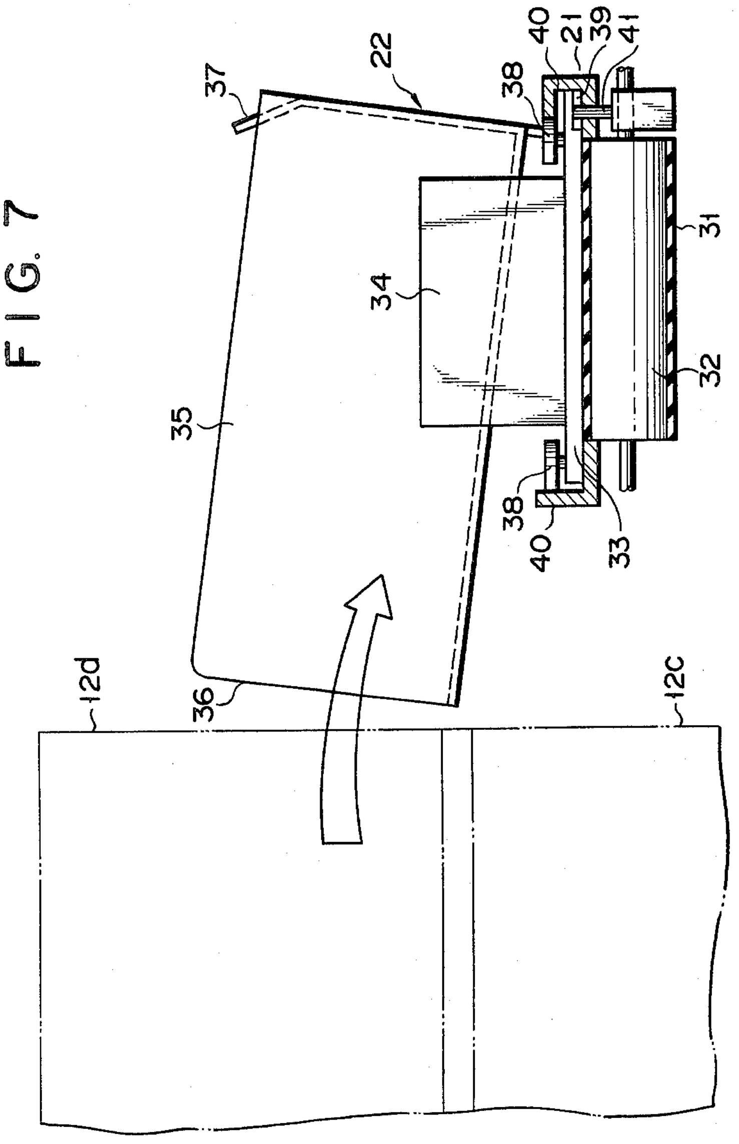
FIG. 7 is an enlarged-scale sectional view of the first horizontal conveyor unit taken along line VII—VII in FIG. 6.

As shown in FIG. 7, the conveyor belt 31 of the conveyor mechanism 21 is driven toward the feed-out end (as shown by an arrow) by a drive roller 32. As shown in FIGS. 6 and 7, each tray 22 includes a base 33, which is supported on the belt 31 in frictional engagement therewith. A pair of vertical plates 34 (only one of which is shown) project upright from the opposite sides of the base 33. A tray body 35 having a substantially channel-like shape is secured to the pair of vertical plates 34. A stopper 37 is secured to the end of the tray body 35 opposite the end facing the sorting unit 10. Guide rollers 38 are mounted on top of the base 33 at the four corners thereof. A locking recess 39 is formed in the base 33 on the lower surface thereof and adjacent to the end provided with the stopper 37. As is seen from FIGS. 6 and 7, the tray body 35 is secured to the pair of vertical plates 34 in an inclined state with respect to the base 33 and belt 31, i.e., in state which is inclined downward from its end 36 facing the sorting unit 10. Thus, as postal matter (A) is transferred into the tray from the corresponding stacking box **12*d* in the direction of the arrow in FIG. 7, it can smoothly proceed along the bottom of the tray body 35 until it strikes the stopper 37**. The transferred postal matter (A) can thus be brought to a neatly stacked state.

As shown in FIG. 7, the guide rollers engage and roll over guide rails 40 which are disposed along the opposite edges of the belt 31. Thus, the base 33 can be prevented from being separated from the belt 31 or being inclined with respect thereto. Magnetically operable stoppers 41 are disposed at intervals along one edge of the belt 31. Each stopper 41 is mounted on one of the guide rails 40. It can be moved between an advanced lock position, in which it is engaged in the locking recess 39 formed in the base 33 of a tray, and a retreated release position, in which it is separated from the locking recess. The stoppers 41 and the locking recesses 39 in the individual trays constitute a locking means. The stoppers 41 are each selectively operated to be locked in the locking recess 39 of a tray at a fixed time interval. The stoppers 41 are each allotted for a plurality of trays 22, that is, six trays in FIG. 6. When the leading one of six trays in a group is locked, the following five trays are thus locked by the leading tray against the frictional resistance of the belt which is continuously moving. In their locked position, these trays 22 correspond to respective pertinent stacking boxes **12*d*. Thus, the trays can be held in accurate register with the corresponding stacking boxes irrespective of the elongation of the belt 31**.

The tray transport unit 23 serves to receive trays 22 from the forward end of each of the first horizontal conveyor mechanisms 18 to 21 and transfer these trays to the second horizontal conveyor unit 25. The tray transfer unit 23 includes vertically movable tray lowering elevators 42 to 44 provided for the respective first horizontal conveyor mechanisms 19 to 21 except for the lowermost one 18. Each of the tray lowering elevators 42 to 44 is movable between an upper position, in which it is at the same level as the associated first horizontal conveyor mechanism, and a lower position, at which it is at the same level as the lowermost first horizontal conveyor mechanism 18. Horizontal auxiliary or relay endless conveyor belts 45 to 47 are provided at the level of the upper position of the respective elevators 42 to 44. They extend between the forward end of the corresponding first horizontal conveyor mechanisms 19 to 21 and elevators 42 to 44. Since the elevators 42 to 44 are disposed side by side, the auxiliary conveyor belts 45 to 47 have different lengths. A horizontal relay endless conveyor belt 48 is provided for the lower most first horizontal conveyor mechanism 18.

When the elevators 42 to 44 reach the lower position, they are aligned to one another in the horizontal direction. These elevators 42 to 44 themselves each include an endless conveyor belt having a tray supporting surface as will be described hereinafter in detail with reference to FIG. 8. Thus, at their lower position, the elevators 42 to 44 together constitute a straight transport path which is aligned with the starting end of the second horizontal conveyor unit 25 at the same level. The second horizontal conveyor unit 25 thus need not be disposed at a level lower than the lowermost first horizontal conveyor mechanism 18. Thus, the height of the apparatus as a whole can be reduced by that amount.

Figure 8:
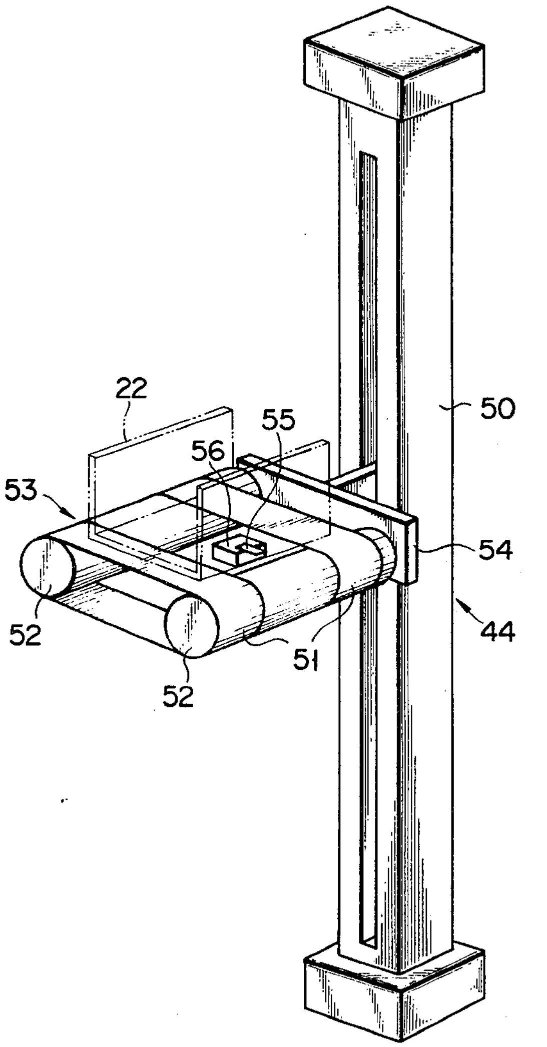
FIG. 8 is a detailed perspective view showing an elevator mechanism constituting a tray transport unit in the transport apparatus of FIG. 3 according to the invention.

FIG. 8 shows the elevator 44 for the uppermost first horizontal conveyor mechanism 21. The other elevators 42 and 43 have the same construction as the elevator 44 except in that a guide pillar 50 has a different length.

The elevator 44 includes a pair of parallel endless belts 51 to support and convey a tray 22 as shown by broken lines. The endless belts are passed around a pair of parallel rollers 52, which constitute a support 53. One of the rollers 52 is given rotational drive force via a roller support frame 54 which can be guided along the guide pillar 50. A microswitch 56 having an actuator 55 and serving as a sensor is mounted on the support frame 54 by suitable means (not shown) such that it is found on top of the support 53 between the pair of endless belts. This microswitch detects whether a tray is adequately supported on the support 53. More particularly, each tray has a projection projecting from a particular point of its underside and capable of touching the actuator 55. The tray is detected to be in the correctly supported state when the projection and actuator 55 are in contact with each other. Thus, if a tray on the support is deviated from the proper position due to vibrations or other causes, it is immediately detected by the microswitch 56.

In the present embodiment, the operation of the support 53 is stopped as soon as a deviation from the proper position is detected by the microswitch, so that the falling of the tray 22 can be prevented.

The second horizontal conveyor unit 25 is at the same level as the lowermost first horizontal conveyor mechanism 18 and on the extension thereof, as is seen from FIG. 4. At the forward end of the second horizontal conveyor unit 25, there is disposed a postal matter transfer mechanism 60 as shown by broken lines, which transfers the postal matter (A) from the tray 22 at the forward end to the conveyor belt 27 with pins in the next process section 26 mentioned above. The mechanism 60 may be of the same construction as a well-known pusher. Immediately ahead of the transfer mechanism 60 in the direction of transport of the second conveyor unit 25, an empty tray transfer mechanism 61 is provided as shown by broken lines, which transfers the empty tray to the starting end of the third horizontal conveyor mechanism 30. The transfer mechanism 61 may be an endless conveyor belt having a small length of transport run extending at right angles to the second and third horizontal conveyor mechanisms 25 and 30, or it may be of the same construction as a customary pusher.

At an intermediate portion of the second horizontal conveyor unit 25 there is a collecting section 62 (as shown by broken lines) that takes postal matter in excess of a predetermined quantity which has the same sorting data but is contained in different trays 22 and collects it into a single tray. On one side of the collecting section 62 a rejecting section 63 is provided also as shown by broken lines, which recovers rejected postal matter from the line of the conveyor unit 25. The construction of the collecting section 62 and rejecting section 63 is irrelevant to the invention, so that this will not be described in any further detail.

The third horizontal conveyor unit 30 is disposed at the same level as the second horizontal conveyor unit 25 and the lowermost first horizontal conveyor mechanism 18.

The construction for conveying trays 22 in the third and second horizontal conveyor units 30 and 25 may be the same as that shown in FIGS. 6 and 7 and described before in connection with the first horizontal conveyor mechanism 21. However, in the third horizontal conveyor unit 30, which needs to fulfil only the function of returning empty trays, the locking mechanism as shown in FIGS. 6 and 7 may be dispensed with so that the unit can transport empty trays continuously and at a high speed.

The second tray transport unit 24 may be of a similar construction to the first tray transport unit 23. In this embodiment the unit 24 includes parallel tray raising elevators 63 to 65 for raising empty trays 22. These elevators 63 to 65 are provided for the respective first horizontal conveyor mechanisms 19 to 21 except for the lowermost one 18. The lower position of the individual elevators is found adjacent to the forward end of the third horizontal conveyor unit 30 and on the extension thereof as shown in FIG. 4. The upper position of the individual elevators is on the extension of the respective first horizontal conveyor mechanisms 19 to 21. In other words, the upper and lower positions of each elevator are deviated in the direction at right angles to the transport in the horizontal conveyor units. Thus, each of the elevators 63 to 65 has an inclined guide pole, while for the rest the construction is the same as that shown in FIG. 8. The tray support surface, however, is vertically moved while it is held horizontal.

The second tray transport unit 24, like the first tray transport unit, includes auxiliary or relay endless conveyor belts 66 to 68 disposed between the upper position of the elevators 63 to 65 and the starting end of the first horizontal conveyor mechanisms 19 to 21.

Auxiliary endless conveyor belts 70 and 71 for transferring trays to the lowermost first horizontal conveyor mechanism 18 are disposed adjacent to the starting end of the mechanism 18 and to the forward end of the third horizontal conveyor unit 30 respectively. Both the auxiliary endless conveyor belts 70 and 71 are at the same level, so that they can be coupled to each other by suitable conveyor means such as an endless conveyor belt.

Empty trays can thus be successively supplied through the tray transport unit 24 to the starting end of the individual first horizontal conveyor mechanisms 18 to 21.

As has been described in the foregoing, with the transport apparatus according to this invention, postal matter and trays are transported in the matter as shown in FIG. 5. More particularly, trays containing postal matter are successively transferred from the first horizontal conveyor mechanisms 18 to 21 through the tray transport unit 23 to the common second horizontal conveyor unit 25. At the forward end of the second horizontal conveyor unit, the postal matter in each tray is transferred to the next process section 26, while the empty tray is transferred to the third horizontal conveyor unit 30 and distributed through the unit 30 and also through the second tray transport unit 24 to the first starting end of the first horizontal conveyor mechanisms 18 to 21.

Since no trays are secured to the first horizontal conveyor mechanisms 18 to 21 unlike the prior art apparatus, the vertical interval of the individual conveyor mechanisms can be greatly reduced. In addition, since the lower position of the tray transport mechanisms and the second horizontal conveyor unit can be set at the same level as the first horizontal conveyor unit, the height of the apparatus as a whole can be reduced.

Further, the transfer of the transported matter is always done in a state contained in trays within the transport apparatus. Thus, it is possible to minimize the possibility for transported matter from getting out of the regularly stacked state before it is transferred to the next process section.

Further, since the trays are fed in frictional engagement with the belt constituting the conveyor mechanism and can be locked by locking means at a position in register with a corresponding stacking box, it is possible to ensure correct register between trays and stacking boxes and correct coincidence of the timing of the feed of trays irrespective of elongation or other deformation of the belt.

What is claimed is:

1. A transport apparatus for transporting sorted stacked matter in a plurality of stacking boxes in a plurality of rows arranged one above another to a next process section, comprising:

first horizontal conveyor means disposed on the back side of said respective rows of stacking boxes and movable along these stacking box rows for conveying trays containing transported matter in one direction, said conveyor means having a starting end and a forward end;

tray lowering means vertically disposed adjacent to the forward end of said first horizontal conveyor means for receiving trays from the individual level stages of said first horizontal conveyor means and lowering the received trays;

second horizontal conveyor means consisting of a single level stage having a starting end connected to said tray lowering means for receiving trays from said tray lowering means and conveying the received trays horizontally up to a forward end of the second horizontal conveyor means;

means for transferring transported matter from each tray at said forward end of the second conveyor means to said next process section;

third horizontal conveyor means for receiving each empty tray from said second horizontal conveyor means and conveying the received empty tray horizontally up to a forward end of the third horizontal conveyor means; and empty tray raising means connected to the forward end of said third horizontal conveyor means for receiving empty trays from said third horizontal conveyor means and distributing the received trays to the starting end of the individual level stages of said first horizontal conveyor means.

2. The transport apparatus according to claim 1, wherein said first horizontal conveyor means conveys trays by frictional engagement therewith and includes locking means for selectively locking trays in position against the frictional engagement.

3. The transport apparatus according to claim 2, wherein said locking means includes a locking recess formed in each tray and magnetically operable stopper means movable between a position locked in said locking recess and a position separated from said locking recess.

4. The transport apparatus according to claim 1, wherein said second and third horizontal conveyor means are at the same level as the lowermost level stage of said first horizontal conveyor means.

5. The transport apparatus according to claim 1, wherein said tray lowering means includes tray lowering elevators provided for the respective level stages of said first horizontal conveyor means except for the lowermost level stage, said tray lowering elevators each being capable of being vertically moved between a position corresponding in level to the corresponding level stage of said first horizontal conveyor means and a position corresponding in level to the lowest level stage of said first horizontal conveyor means, each said tray lowering elevator being in register with the longitudinal extension of the lowermost level stage of said horizontal conveyor means when it is in the lower position.

6. The transport apparatus according to claim 1, wherein said third horizontal conveyor means extends parallel with said first horizontal conveyor means and on the side thereof opposite said rows of stacking boxes.

7. The transport apparatus according to claim 1, wherein said empty tray raising means includes tray raising elevators provided for the respective level stages of said first horizontal conveyor means except for the lowermost level stage, said tray lowering elevators each being capable of vertically moving between a position corresponding in level to the level stage of said first horizontal conveyor means and a position corresponding in level to the lowermost level stage of said first horizontal conveyor means.

* * * * *